(12) United States Patent
Klassen et al.

(10) Patent No.: US 6,351,724 B1
(45) Date of Patent: Feb. 26, 2002

(54) APPARATUS AND METHOD FOR MONITORING THE PERFORMANCE OF A MICROPROCESSOR

(75) Inventors: Steven R. Klassen; Atish Ghosh, both of Austin; Hans L. Magnusson, Buda, all of TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/758,487

(22) Filed: Jan. 10, 2001

Related U.S. Application Data

(63) Continuation of application No. 08/994,702, filed on Dec. 19, 1997, now Pat. No. 6,233,531.

(51) Int. Cl.[7] ............................................... G06F 11/30
(52) U.S. Cl. ..................... 702/186; 702/80; 702/180; 702/187; 712/227; 714/39; 714/30; 714/47
(58) Field of Search ................................. 702/186–188, 702/80, 78, 79, 69, 182–185, 117–126, 177–180, 108, FOR 135, FOR 134, FOR 170, FOR 171, FOR 103, FOR 104, FOR 109, FOR 110; 714/43, 30, 35, 37, 47, 38, 39, 733, 25, 45; 712/227; 324/73.1; 710/101

(56) References Cited

U.S. PATENT DOCUMENTS

| | | | |
|---|---|---|---|
| 4,872,121 A | * 10/1989 | Chan et al. | 702/182 |
| 5,226,153 A | 7/1993 | DeAngelis et al. | 702/187 |
| 5,657,253 A | 8/1997 | Dreyer et al. | 702/186 |
| 5,691,920 A | 11/1997 | Levine et al. | 702/186 |
| 5,729,678 A | 3/1998 | Hunt et al. | 714/43 |
| 5,754,449 A | 5/1998 | Hoshal et al. | 702/187 |
| 5,790,831 A | 8/1998 | Lin et al. | 710/101 |
| 5,796,939 A | * 8/1998 | Berc et al. | 714/47 |
| 5,970,439 A | 10/1999 | Levine | 702/186 |
| 6,000,044 A | * 12/1999 | Chrysos et al. | 702/186 |
| 6,023,759 A | 2/2000 | Omtzigt | 712/227 |

OTHER PUBLICATIONS

Ludloff, "News.Com Tech News First: Appendix H . . . and no end in sight," found and downloaded from http://www.sandpile.org, last updated Aug. 22, 1998 and printed Sep. 29, 1998, 4 sheets.

Ludloff, "News.Com Tech News First: Performance Monitoring," found and downloaded from http://www.sandpile.org, last updated Aug. 22, 1998 and printed Sep. 29, 1998, 3 sheets.

Ludloff, "Worldwide Computer Superstores: Pentium Performance Monitoring events," found and downloaded from http://www.sandpile.org, last updated Aug. 22, 1998, and printed Sep. 29, 1998, 4 sheets.

Ludloff, "Worldwide Computer Superstores: Pentium MSRs," found and downloaded from http://www.sandpile.org, last updated Aug. 22, 1998, and printed Sep. 29, 1998, 9 sheets.

* cited by examiner

*Primary Examiner*—Hal Wachsman
(74) *Attorney, Agent, or Firm*—Conley, Rose & Tayon, PC; Robert C. Kowert

(57) ABSTRACT

An apparatus and method are presented for monitoring the performance of a microprocessor. The apparatus includes performance monitoring hardware incorporated within the microprocessor. The performance monitoring hardware includes a memory unit for storing performance data. The memory unit includes multiple memory locations, each memory location being accessed by a unique set of address signals. Circuitry within the performance monitoring hardware produces the address signals. In one embodiment, the performance monitoring hardware includes an event select register array and circuitry for producing a set of high order (i.e., most significant) address signals. The event select register array preferably includes several event select registers for storing binary codes corresponding to selected events. A performance data acquisition period is divided into multiple histogram time periods of equal length. The high order address signals partition the memory unit into sections. Each section is associated with a given histogram time period.

37 Claims, 4 Drawing Sheets

APPARATUS AND METHOD FOR MONITORING THE PERFORMANCE OF A MICROPROCESSOR

This application is a continuation of U.S. application Ser. No. 08/994,702 filed Dec. 19, 1997, now issued as U.S. Pat. No. 6,233,531.

BACKGROUND OF THE INVENTION

1. Field of the Invention

This invention relates to computer systems, and more particularly to monitoring the performance of a microprocessor.

2. Description of the Relevant Art

Most computer systems include a microprocessor which functions as a central processing unit (CPU). Modern microprocessors, including the Intel Pentium™ processor, have hardware dedicated for measuring and monitoring various parameters which contribute to the performance of the microprocessor. In the case of the Pentium™ processor, the dedicated hardware includes several model specific registers (MSRs): a 64-bit time stamp counter (TSC) incremented every clock cycle, a control & event select register (CESR), and two 40-bit performance monitor counters (CTRs). The TSC, CESR, and the two CTRs are addressable registers, and their contents may be read or changed by software instructions. Each CTR may be individually programmed, via values stored within the CESR, to count the total number (or duration in clock cycles) of specific "events" occurring within the microprocessor during operation. Such events include memory accesses (e.g., data/code reads and data writes), data/code cache misses, pipeline flushes, and locked bus cycles. The information provided by the dedicated hardware may be used to improve the overall performance of the computer system by "tuning" the memory system or software programs generated by compilers.

Several problems limit the usefulness of the existing performance monitoring hardware. First, there are only two CTRs, thus a maximum of two events may be monitored at any given time. The CTRs are programmed by values stored within the CESR, and there are a fixed number of events to choose from. For example, there are 38 documented events from which to choose for the Pentium™ processor. In order to obtain counts for all events which may be monitored, it is necessary to repeat a test program 19 times while gathering counts for two events during each execution of the test program.

Second, and most importantly, there is no way to correlate the occurrence of an event with the time at which the event occurred. In cases where several factors affect a given aspect of system performance, the total number of events may indicate the presence or absence of a problem, but may not be particularly useful in determining the best solution to a problem. In some cases, a graph of the frequency distribution of an event is much more useful than the total number of events which occurred during execution of a test program.

A histogram is a bar graph of a frequency distribution in which the heights of the bars represent the total number of events occurring within a corresponding time interval. Forming a histogram involves dividing a time period of interest into time intervals of equal length, and counting the total number of events occurring within each time interval. As a practical matter, summing numbers of events occurring within time intervals reduces the data storage requirements of a data acquisition system performing the counting operation while still providing useful event frequency information.

A good example illustrating the utility of a graph of the frequency distribution of an event is cache misses occurring during execution of a test program. FIGS. 1 and 2 will now be used to illustrate how such a graph may suggest which of several factors is the most likely cause of a problem. As described above, a desired data acquisition time is divided into time intervals (i.e., histogram time periods) of length t, and the total number of cache misses occurring within each histogram time period t are counted and graphed. FIG. 1 is a histogram showing the frequency of cache misses occurring within a first memory system during execution of the test program. In the first memory system, the frequency of cache misses follows a trend. The frequency of cache misses is initially high as the empty cache is filled, decreases relatively quickly at an initial rate 10, then continues to decrease as more needed instructions are located within the cache. Eventually a lowest number of cache misses "M1" is achieved by the first memory system. Sudden increases or "spikes" (e.g., spike 12) in the frequency of cache misses occur as when new sections of program code are loaded into memory and executed.

FIG. 2 is a histogram showing the frequency of cache misses occurring within a second memory system during execution of the same test program. As in the first memory system, the frequency of cache misses within the second memory system is initially high as the empty cache is filled, and decreases with time as more needed instructions are found within the cache. The initial rate of the decrease 14 is not as great as that of the first memory system, however, and the lowest number of cache misses M2 achieved by the second memory system is substantially greater than M1. Spike 16 corresponds to spike 12, and occurs as the same section of program code is loaded into memory and executed. Spike 16 occurs later in time than spike 12 as the second memory system is less efficient than the first.

Key factors which affect the frequency of cache misses within a memory system include cache size and the technique used to select information stored within the cache for replacement by "newer" data (i.e., the cache replacement algorithm). FIG. 1 indicates the cache replacement algorithm of the first memory system is adequate. The best way to reduce the frequency of cache misses and thereby improve the performance of the first memory system is to increase the size of the cache. On the other hand, FIG. 2 indicates the cache replacement algorithm of the second memory system is probably not working well. Increasing the size of the cache would not be the best way to improve the performance of the second memory system; improving the cache replacement algorithm would probably be more effective.

It would be beneficial to have a microprocessor which includes performance monitoring hardware allowing more than two events to be monitored at any given time and correlating the occurrence of an event with the time at which the event occurred. Such a microprocessor would reduce the number of times a test program must be executed in order to gather performance monitoring information. Such a microprocessor would also allow graphs of numbers of events versus time to be created, greatly enhancing the ability to increase the overall performance of the computer system by "tuning" the memory system or instruction sequences generated by compilers.

SUMMARY OF THE INVENTION

The problems outlined above are in large part solved by an apparatus and method for monitoring the performance of a microprocessor. The apparatus includes performance monitoring hardware incorporated within the microprocessor. The performance monitoring hardware includes a memory unit for storing performance data relating to operations performed by the microprocessor. The memory unit includes multiple memory locations, each memory location being accessed by a unique set of address signals. The performance monitoring hardware further includes circuitry coupled to the memory unit for producing address signals. The apparatus and method center around gathering performance data in order to generate event histograms.

In one embodiment, the performance monitoring hardware further includes an event select register array, a control register, a bus monitor unit, circuitry coupled to the memory unit for producing a set of high order (i.e., most significant) address signals, and a control unit. The event select register array includes n event select registers, where $n \geq 1$, and preferably $n \geq 2$. Each event select register may contain a binary code corresponding to a selected event. The event select register array allows the performance monitoring hardware to monitor up to n selected events within the microprocessor.

The control register enables and disables a performance data acquisition mode of the performance monitoring hardware. The control register also includes an event select register field which determines the specific event select register accessed within the event select register array, and a memory address field which determines which memory location within the memory unit is accessed during retrieval of performance data stored within the memory unit.

The bus monitor unit is coupled to internal address, data, and control signal lines within the microprocessor, the event select register array, the control register, and the control unit. The bus monitor unit is also operably coupled to the memory unit. The bus monitor unit detects the occurrence of each of the up to n selected events stored within the event select register array. The occurrence of a selected event is determined by signals driven upon the internal address, data, and control signal lines of the microprocessor. Upon detecting one or more of these selected events, the bus monitor unit produces an event signal and a low order (i.e., least significant) address signals, and wherein a is an integer and $a \geq \log_2(n)$.

The circuitry coupled to the memory unit for producing the set of high order address signals includes a time stamp counter, a histogram time base register, a time base comparator, and a histogram counter. The time stamp counter is a counter configurable to increment every cycle of a processor clock signal. The histogram time base register is used to store the number of processor clock cycles within each histogram time period. The time base comparator is coupled to the time stamp counter and the histogram time base register. The time base comparator divides the contents of the time stamp counter by the value stored within the histogram time base register and produces a clock pulse when the remainder of the division is zero. The histogram counter is a counter which receives the clock pulses produced by the time base comparator and increments upon each received clock pulse. The contents of the histogram counter forms the set of high order address signals.

The control unit is coupled between the bus monitor unit and the memory unit. The control unit produces control signals in response to the event signal which result in the incrementing of a value stored within a memory location within the memory unit. The memory location is accessed by concatenating the high order address signals and the low order address signals.

A performance data acquisition period is divided into multiple histogram time periods of equal length. The high order address signals produced by the histogram counter partition the memory unit into sections. Each section is associated with a given histogram time period and contains at least n memory locations, where n is the number of event select registers within the event select register array and the maximum number of selected events. Each section is used to store performance data relating to the selected events which occur during the corresponding histogram time period.

Each occurrence of one of the n selected events during a given histogram time period results in the incrementing of the contents of a corresponding memory location within the corresponding section of the memory unit. For example, the occurrence of an event identified within event select register 0 (i.e., event 0) results in the incrementing of the contents of memory location xx00h. During the first histogram time period, the high order address signals produced by the histogram counter are 00 . . . 0, and the contents of memory location 00 . . . 0000000 is incremented. Similarly, the occurrence of event 1 during the first histogram period results in the incrementing of the contents of memory location 00 . . . 0000001.

A computer system in accordance with the present invention includes the microprocessor described above. The microprocessor functions as a central processing unit (CPU), and includes performance monitoring hardware having a memory unit for storing performance data. In addition to the microprocessor, the computer system may include a system bus adapted for coupling to one or more peripheral devices. Chip set logic coupled between the microprocessor and the system bus may function as an interface between the microprocessor and the system bus.

A method for monitoring the performance of the microprocessor of the computer system described above includes enabling the performance data acquisition mode of the performance monitoring hardware, then causing the microprocessor to execute a set of instructions. During instruction execution, performance data is stored within the memory unit of the performance monitoring hardware. Following execution of the set of instructions, the performance data acquisition mode is disabled, and the data stored within the memory unit is retrieved using circuitry for this purpose within the performance monitoring hardware.

BRIEF DESCRIPTION OF THE DRAWINGS

Other objects and advantages of the invention will become apparent upon reading the following detailed description and upon reference to the accompanying drawings in which.

Figure 1:
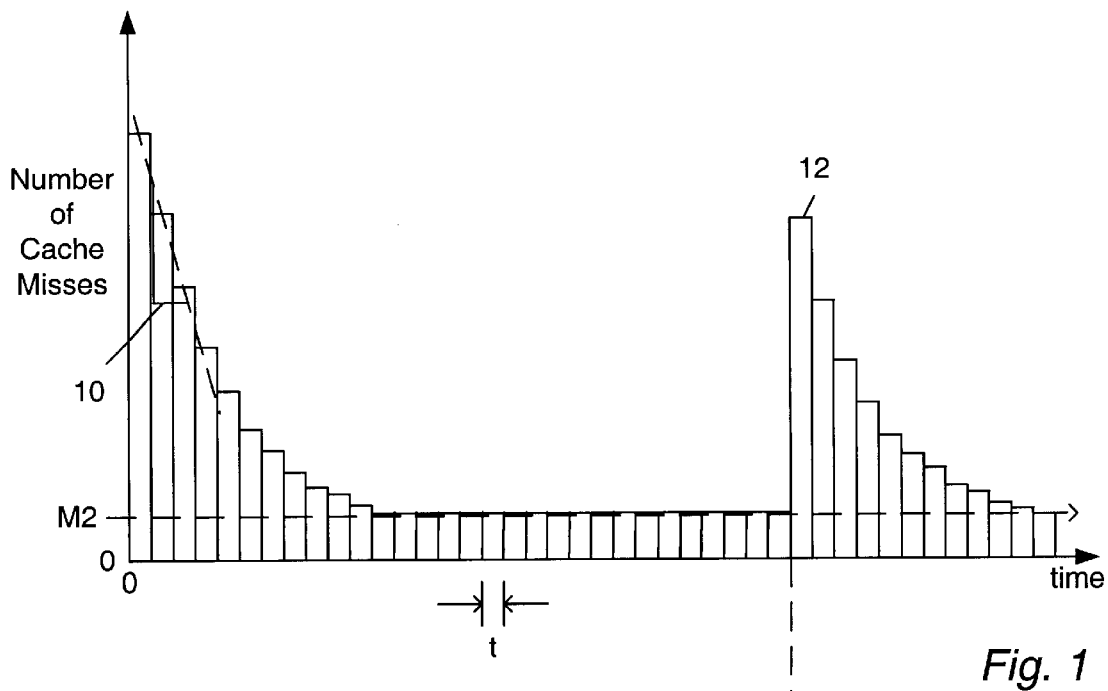
FIG. 1 is a histogram showing the frequency of cache misses occurring within a first memory system during execution of a test program, wherein the first memory system employs an adequate cache replacement algorithm.
Figure 2:
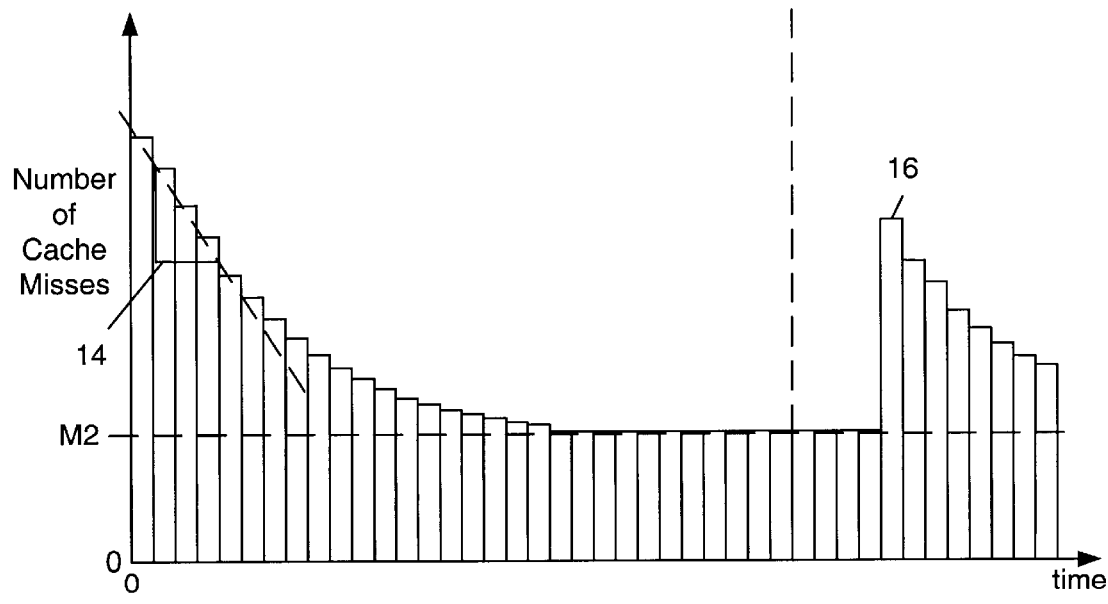
FIG. 2 is a histogram showing the frequency of cache misses occurring within a second memory system during execution of the test program, wherein the second memory system employs an inadequate cache replacement algorithm.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 3:
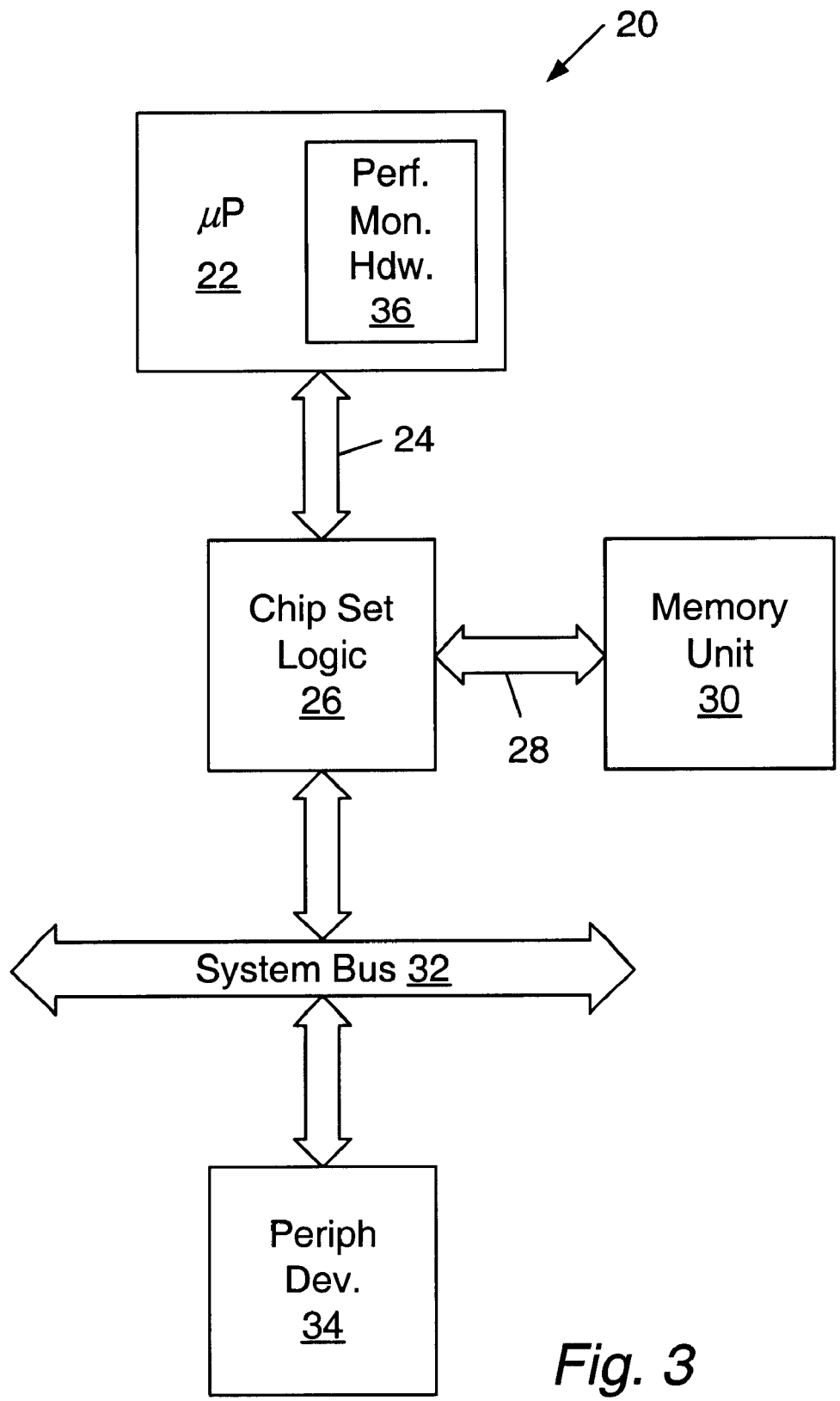
FIG. 3 is a block diagram of one embodiment a computer system in accordance with the present invention, wherein the computer system includes a microprocessor which functions as a central processing unit (CPU), a system bus adapted for coupling to one or more peripheral devices, chip set logic coupled between the microprocessor and the system bus which functions as interface between the microprocessor and the system bus, and a peripheral device coupled to the system bus, and wherein the microprocessor includes performance monitoring hardware having a memory unit for storing performance data relating to operations performed by the microprocessor.

FIG. 3 is a block diagram of one embodiment a computer system 20 in accordance with the present invention. Computer system 20 includes a microprocessor 22 which functions as a central processing unit (CPU), a processor bus 24, chip set logic 26, a memory bus 28, a memory unit 30, a system bus 32, and a peripheral device 34. Microprocessor 22 is preferably an integrated circuit formed upon a single monolithic semiconductor substrate. Processor bus 24 couples microprocessor 22 to chip set logic 26. Chip set logic 26 is coupled to system bus 32 and functions as interface between microprocessor 22 and system bus 32. Chip set logic 26 is also coupled between microprocessor 22 and memory unit 30. Memory unit 30 stores data, and preferably includes semiconductor memory devices. Chip set logic 26 is coupled to memory unit 30 via memory bus 28, and may include a memory controller. System bus 32 is adapted for coupling to one or more peripheral devices. Peripheral device 34 is coupled to system bus 32, and may be, for example, a disk drive unit, a video display unit, or a printer.

Microprocessor 22 includes performance monitoring hardware 36. During operation of computer system 20, microprocessor 22 executes software instructions. Performance monitoring hardware 36 may be configured to monitor and store (i.e., log) information concerning various aspects of microprocessor 22 during operation and as a function of time. For example, performance monitoring hardware 36 may be configured to log information during execution of a test program or a set of software instructions. Following completion of the test program or set of instructions, the stored information may be retrieved and graphed in an effort to increase the overall performance of the computer system by "tuning" the memory system. If the test program or set of instructions is generated by a compiler, the compiler may be also be tuned in order to increase the overall performance of the computer system when executing sets of instructions generated by the compiler.

Figure 4:
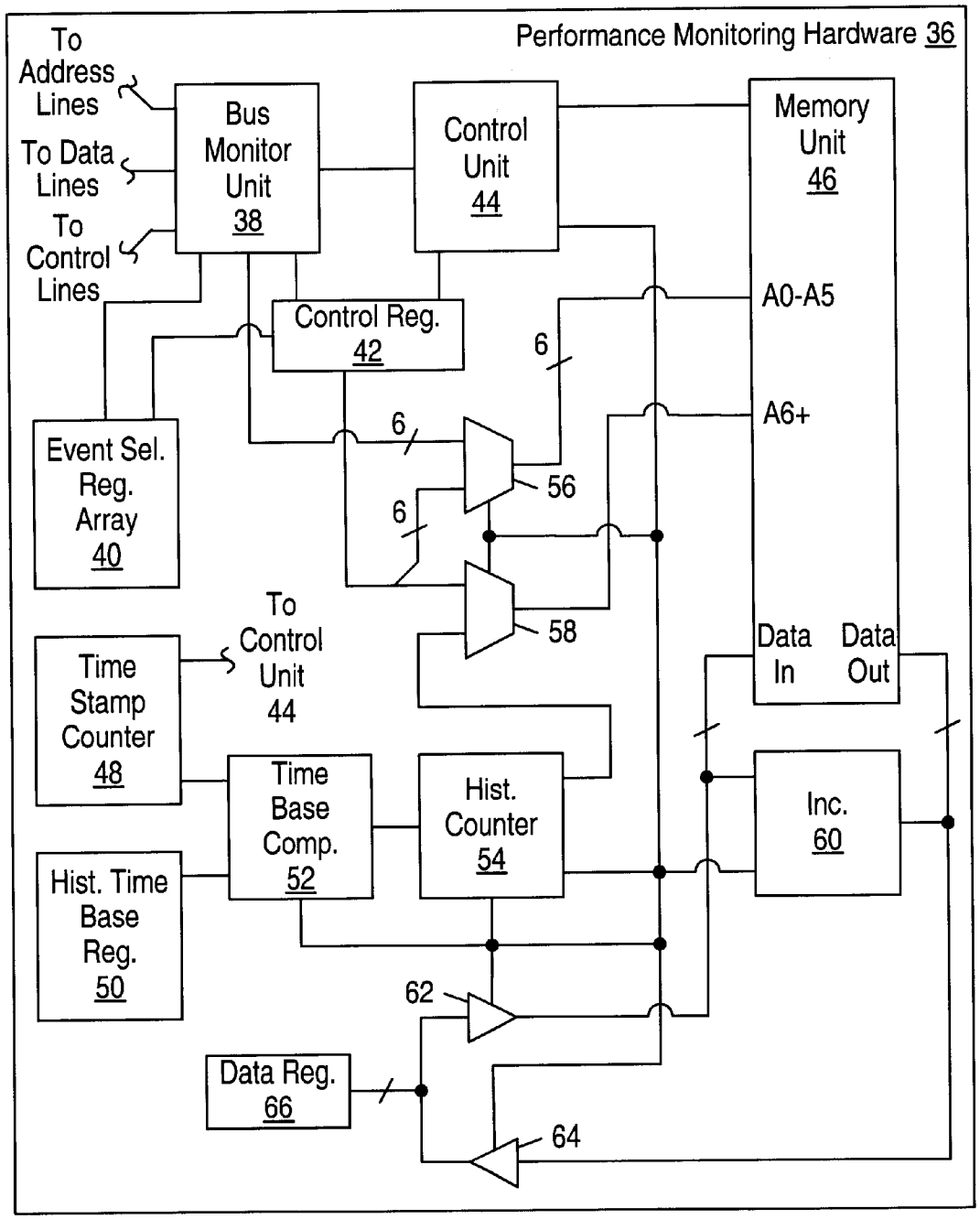
FIG. 4 is a block diagram of one embodiment of the performance monitoring hardware of the microprocessor of FIG. 3, wherein the performance monitoring hardware includes a control register and an event select register array.

FIG. 4 is a block diagram of one embodiment of performance monitoring hardware 36. In the embodiment shown, performance monitoring hardware 36 includes a bus monitor unit 38 coupled to internal address, data, and control lines of microprocessor 22, an event select register 40, a control register 42, and a control unit 44. Control unit 44 is coupled to a memory unit 46. Bus monitor unit 38 monitors signals driven upon the internal address, data, and control lines of microprocessor 22 in accordance with control signals received from event select register array 40 and control register 42.

Memory unit 46 includes multiple memory locations, each memory location being accessed by a unique set of address signals (i.e., having a unique address). Memory unit 46 preferably includes semiconductor memory devices, for example static random access memory (SRAM). Each memory location has the capability to store integer values between 0 and, for example, 65,535 ($2^{16}-1$).

When enabled by control register 42 and a selected "event" occurs, bus monitor unit 38 produces an event signal. The occurrence of an event is determined by signals driven upon the internal address, data, and control signal lines of the microprocessor. For example, microprocessor 22 may include separate data and code cache memory systems (not shown). Exemplary events include memory data read and/or write operations, data cache read or write misses, and code cache read or write misses. Control unit 44 receives the event signal, and produces the control signals necessary to increment the contents of a memory location within memory unit 46. Bus monitor unit 38 is configured to monitor n separate events, where $n \geq 1$, and preferably $n \geq 2$.

Bus monitor unit 38 produces an integer number of address signals a required to binary encode the n separate address signals, where $a \geq \log_2(n)$. The value of a is preferably made as small as possible. The a address signals produced by bus monitor unit 38 represent the low order (i.e., least significant) a bits of an address of a memory location within memory unit 46 where current performance data is to be stored. For example, in the embodiment of FIG. 4, bus monitor unit 38 is configured to monitor up to 64 separate events, thus $a \geq \log_2(64)$, or $a \geq 6$. Bus monitor unit 38 produces 6 address signals which represent the low order 6 bits of the address of the memory location within memory unit 46.

Performance monitoring hardware 36 also includes a time stamp counter 48, a histogram time base register 50, a time base comparator 52, and a histogram counter 54. Time stamp counter 48 may be, for example, a free running counter configurable to increment every cycle of a clock signal which synchronizes logic functions within microprocessor 22 (i.e., a processor clock signal). Time stamp counter 48 may be, for example, a 64-bit counter which can be enabled, disabled, read, written, and cleared (i.e., all bits set to 0) by software instructions executed by microprocessor 22. Time stamp counter 48 may also be cleared by a control signal issued by control unit 44.

Histogram time base register 50 is used to store a time period between the beginning and the end of a monitored event sample period (i.e., a histogram time period) in the form of the corresponding number of processor clock cycles.

For example, if the histogram time period is 12 microseconds and the frequency of the processor clock is 200 MHz, the contents of the histogram time base register is:

$$(12 \times 10^{-6} \text{ seconds}) \cdot (200 \times 10^{6} \text{ processor clock cycles/second}) = 2400 \text{ processor clock cycles}$$

Histogram time base register 50 is an "addressable" register which may be read or written using software instructions. In other words, data may be stored in histogram time base register 50 by a write operation to the address assigned to histogram time base register 50, and data stored within histogram time base register 50 may be retrieved by a read operation to the address assigned to histogram time base register 50.

Time base comparator 52 is a modulo p comparator receiving inputs from time stamp counter 48 and histogram time base register 50. Time base comparator 52 divides the value stored within time stamp counter 48 by the contents of histogram time base register 50 (i.e., the value p). If the remainder of the division operation is zero, time base comparator 52 produces a clock pulse. Time base comparator 52 is cleared by a control signal from control unit 44.

Histogram counter 54 receives clock pulses produced by time base comparator 52, and increments with every clock pulse. The contents of histogram counter 54 represents the high order address bits of the memory location within memory unit 46 where current performance data is to be stored. The number of bits within histogram counter 54 depends upon the number of memory locations within (i.e., the size of) memory unit 46.

A desired length of time for performance data acquisition (i.e., a performance data acquisition period) is divided into multiple histogram time periods of equal length. The high order address signals produced by histogram counter 54 partition memory unit 46 into sections. The number of sections may be equal to the number of histogram time periods, or may be less than the number of histogram time periods as will be explained below. Each section is associated with a given histogram time period and contains at least n memory locations, where n is the number of event select registers within the event select register array and the maximum number of selected events. Each section is used to store performance data relating to the selected events which occur during the corresponding histogram time period. Each time histogram counter 54 receives a clock pulse and increments, the contents of histogram counter 54 is the base address of (i.e., points to) a new section within memory unit 46.

Performance monitoring hardware 36 also includes a first multiplexer 56, a second multiplexer 58, an incrementer 60, a first data buffer 62, a second data buffer 64, and a data register 66. First multiplexer 56 receives as inputs the 6 address signals produced by bus monitor unit 38 and the least significant 6 bits (i.e., bits 0–5) of the contents of a memory address field within control register 42. First multiplexer 56 selects between the inputs in response to a control signal produced by control unit 44. The 6 least significant address terminals (A0–A5) of memory unit 46 receive the 6 output signals produced by first multiplexer 56. When performance monitoring hardware 36 is monitoring and periodically saving (i.e., logging) performance data, first multiplexer 56 produces as outputs the 6 address signals produced by bus monitor unit 38. When performance monitoring hardware 36 is retrieving performance data stored within memory unit 46, first multiplexer 56 produces the least significant 6 bits of the contents of the address field within control register 42.

Second multiplexer 58 receives as inputs the contents of histogram counter 54 and the most significant bits (i.e., bits 6+) of the contents of the memory address field within control register 42. Second multiplexer 58 selects between the inputs in response to a control signal produced by control unit 44. The most significant address terminals (A6+) of memory unit 46 receive the output signals produced by second multiplexer 58. When performance monitoring hardware 36 is monitoring and periodically saving (i.e., logging) performance data, second multiplexer 58 produces as outputs the contents of histogram counter 54. When performance monitoring hardware 36 is retrieving performance data stored within memory unit 46, second multiplexer 58 produces the most significant bits of the contents of the address field within control register 42.

Incrementer 60 is coupled between "data in" and "data out" terminals of memory unit 46. When performance monitoring hardware 36 is logging performance data, incrementer 60 increments the contents of memory locations within memory unit 46 in response to control signals from control unit 44. Incrementer 60 receives as input the value produced at the data out terminal of memory unit 46, increments the value, and provides the incremented value to the data in terminal. For example, the memory location within memory unit 46 may be accessed and the value stored within the memory location provided to incrementer 60 during the first half of a processor clock cycle. The value may be incremented by incrementer 60 and written back to the same memory location during the second half of the processor clock cycle.

Data register 66 is an addressable register which may be read or written using software instructions. Data register 66 is used to store data within memory locations of memory unit 46 and to retrieve performance data from within memory locations of memory unit 46.

Data buffer 62 is coupled between data register 66 and the data in terminal of memory unit 46, and provides capability for storing the contents of data register 66 within a memory location of memory unit 46. Data buffer 62 receives the contents of data register 66 as input, and provides the contents of data register 66 to the data in terminal of memory unit 46 in response to a control signal from control unit 44.

Data buffer 64 is coupled between the data out terminal of memory unit 46 and data register 66, and provides capability for retrieving performance data stored within memory unit 46. Data buffer 64 receives the value produced at the data out terminal of memory unit 46 (i.e., the contents of a memory location within memory unit 46) as input, and provides the value to data register 66 in response to a control signal from control unit 44.

Figure 5:
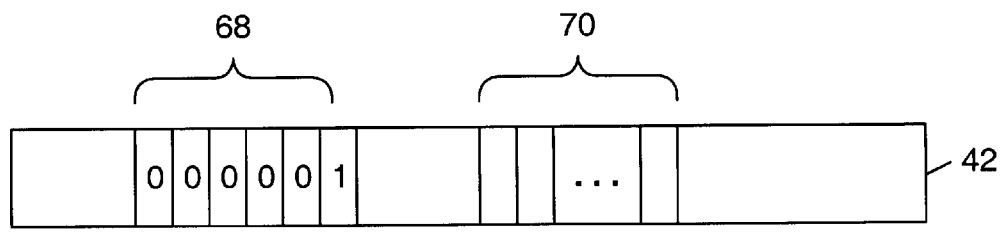
FIG. 5 is a diagram of one embodiment of the control register of FIG. 4, wherein the control register includes an event select register field which determines the specific event select register accessed within the event select register array, and wherein the control register also includes a memory address field which determines which memory location is accessed within the memory unit during retrieval of performance data stored within the memory unit.
Figure 6:
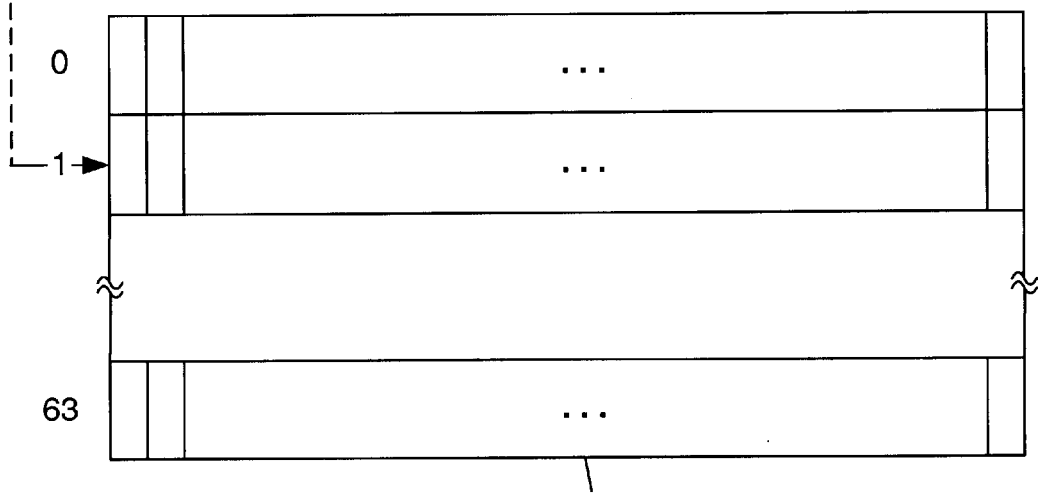
FIG. 6 is a diagram of one embodiment of the event select register array of FIG. 4, wherein the event select register preferably includes several event select registers, and wherein each event select register is used to store a binary code corresponding to a selected event occurring within the microprocessor.

FIGS. 5 and 6 will now be used to describe exemplary embodiments of control register 42 and event select register array 40. FIG. 5 is a diagram of one embodiment of control register 42. Control register 42 is an addressable register which may be read or written using software instructions. FIG. 6 is a diagram of one embodiment of event select register array 40. Event select register 40 includes 64 event select registers numbered 0 through 63. Each event select register is used to store a binary code assigned to an event to be monitored by performance monitoring hardware 36. Event select register array 40 is also addressable and may be read or written using software instructions.

Access to specific event select registers within event select register array 40 is through control register 42. In the embodiment of FIG. 5,, control register 42 includes a 6-bit event select register field 68. The contents of the event select register field determines the specific event select register accessed within event select register array 40. Accordingly, a specific event select register is accessed by first writing a value to control register 42 having appropriate values within the event select register select field. A subsequent write operation to the address assigned to event select register array 40 will store data within the event select register identified within the event select register select field. Similarly, a subsequent read operation to the address assigned to event select register array 40 will retrieve data within the event select register identified within event select register select field 68.

Control register 42 also includes a memory address field 70. Memory address field 70 is used to store the address of a memory location within memory unit 46 accessed during retrieval of performance data stored within memory unit 46.

Table 1 below is a partial listing of exemplary performance monitoring events and binary codes associated with those events:

TABLE 1

Exemplary Performance Monitoring Events and Associated Codes.

| Performance Monitoring Event | Code |
|---|---|
| Data Read | 000000 |
| Data Write | 000001 |
| Data Read or Data Write | 101000 |
| Data TLB Miss | 000010 |
| Data Read Miss | 000011 |

Once selected event codes have been stored within event select register array 40 and bus monitor unit 38 is enabled (e.g., by storing specific values within one or more control bits of control register 42), a performance data acquisition mode of performance monitoring hardware 36 is enabled. When the performance data acquisition mode is enabled, control unit 44 issues control signals which store the value 00 . . . 0 within (i.e., clear) time stamp counter 48, histogram counter 54, and all memory locations within memory unit 46. Accordingly, histogram counter 54 produces the value 00 . . . 0, and second multiplexer 58 provides the value 00 . . . 0 produced by histogram counter 54 to the high order address terminals (i.e., A6+) of memory unit 46.

When one or more of the events identified within event select register array 40 occur, bus monitor unit 38 produces the event signal. Control unit 44 receives the event signal as described above, and generates the signals necessary to increment the contents of a memory location within memory unit 46. Bus monitor unit 38 produces the a low order address signals dependent upon the events which occur. If the event identified in event select register r of event select register array 40 (i.e., event r) occurs, the value of the a binary address signals produced by bus monitor unit 38 is r. For example, if event 0 occurs, the value of the a binary address signals produced by bus monitor unit 38 is 0. Thus the contents of memory location xx00h within memory unit 46 is incremented. During the fist histogram sample period, the high order address bits of the memory location within memory unit 46 are 00 . . . 0, and the address signals produced by bus monitor unit 38 represent the low order address bits. Thus the contents of memory location 00 . . . 0000000 is incremented. Similarly, if the event identified in event select register 3 occurs during the first histogram sample period, the value of the binary address signals produced by bus monitor unit 38 is 3, and the contents of memory location 00 . . . 0000011 within memory unit 46 is incremented.

Retrieval of performance data stored within a specific memory location of memory unit 46 is accomplished by writing a value to control register 42 having appropriate values within memory address field 70. In response, control unit 44 generates the necessary control signals to cause memory unit 46 to provide the performance data within the memory location identified within memory address field 70 of control register 42 at the data out terminal, and to cause data buffer 64 to provide the performance data to data register 66. A subsequent read operation to the address assigned to data register 66 will retrieve the performance data stored within the memory location identified within memory address field 70. A series of sequential write operations to control register 42 and read operations from data register 66 may be used to retrieve all of the performance data stored within memory unit 46.

The performance data retrieved from memory unit 46 may be used to construct a histogram of one or more events occurring during a performance data acquisition period. For example, the frequency of the event identified within event select register 0 (i.e., event 0) during the first histogram sample period is found within memory location 00 . . . 0000000. Similarly, the frequency of event 3 during the first histogram sample period is found within memory location 00 . . . 0000011.

A method for monitoring the performance of microprocessor 22 of computer system 20 includes enabling the performance data acquisition mode of performance monitoring hardware 36, then causing the microprocessor 22 to execute a test program or a set of instructions. During instruction execution, performance data is stored within memory unit 46 of performance monitoring hardware 36. Following execution of the test program or set of instructions, the performance data acquisition mode is disabled, and the data stored written memory unit 46 is retrieved as described above.

It is noted that if the amount of time required to execute the test program or set of instructions is long enough that the number of histogram time periods exceeds the number of sections within (i.e., the capacity of) memory unit 46, instruction execution may be temporarily suspended (e.g., by interrupt), the performance data acquisition mode disabled, the contents of memory unit 46 retrieved and possibly transferred to memory unit 30, the performance data acquisition mode re-enabled, and instruction execution resumed. This procedure allows arbitrary length of the performance data acquisition period.

It will be appreciated by those skilled in the art having the benefit of this disclosure that this invention is believed to be an apparatus and method for monitoring the performance of a microprocessor. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A microprocessor, comprising:
   a bus monitor configured to provide one or more indications in response to one or more occurrences of one or more events within the microprocessor;
   a memory configured to store data about the occurrences of the one or more events within the microprocessor; and
   a control unit coupled to the bus monitor and the memory, wherein the control unit is configured to detect the one or more indications provided by the bus monitor and, in response, to control the memory to store data indicating a number of the occurrences of each of the one or more events during each of a plurality of consecutive time periods;

wherein the memory comprises a different storage location per event per time period, so that each storage location is configured to store a number of occurrences of a respective one of the one or more events during a respective one of the plurality of consecutive time periods.

2. The microprocessor as recited in claim 1, wherein each of the plurality of consecutive time periods is of equal length.

3. The microprocessor as recited in claim 1, wherein the bus monitor is further configured to generate an event address portion for each occurrence of the one or more events, wherein the event address portion indicates which of the one or more events occurred, and wherein the memory is configured to receive the event address portion.

4. The microprocessor as recited in claim 3, wherein the control unit is configured to cause one of the numbers stored in one of the storage locations indicated by the event address portion to be incremented in response to an occurrence of a respective one of the one or more events indicated by the event address portion.

5. The microprocessor as recited in claim 1, further comprising:

a histogram counter configured to generate a time period address for each of the plurality of consecutive time periods; and wherein the memory is configured to receive the time period address.

6. The microprocessor as recited in claim 5, wherein the memory comprises a plurality of sections, wherein each section is selected by the time period address, wherein each section is configured to store a number of occurrences of each of the one or more events during a respective one of the plurality of consecutive time periods indicated by the time period address.

7. The microprocessor as recited in claim 5, further comprising a time base register coupled to the histogram counter, wherein the time base register is programmable to store an indication of the length of each of the plurality of consecutive time periods, wherein each of the plurality of consecutive time periods is of equal length as indicated by the time base register.

8. The microprocessor as recited in claim 1, further comprising a plurality of event select registers, wherein each event select register is programmable to indicate an event to be detected by the bus monitor.

9. The microprocessor as recited in claim 1, further comprising a control register programmable to enable and disable the bus monitor.

10. The microprocessor as recited in claim 1, further comprising:

a data register readable to retrieve from the memory the data indicating the number of the occurrences of the one or more events within the microprocessor; and a control register programmable to indicate a location of the memory readable through the data register.

11. The microprocessor as recited in claim 1, wherein the bus monitor is configured to monitor address, data and control signals within the microprocessor to detect the occurrences of the one or more events.

12. The microprocessor as recited in claim 1, wherein the one or more events are selected from the group consisting of:
a data read, a data write, a data read or data write, a data TLB (Translation Lookaside Buffer) miss, and a data read miss.

13. A computer system, comprising:

a microprocessor;

a system memory coupled to the microprocessor;

a system bus;

chip set logic configured to interface the microprocessor to the system bus; and one or more peripheral devices coupled to the system bus;

wherein the microprocessor comprises:

a bus monitor configured to provide one or more indications in response to one or more occurrences of one or more events within the microprocessor;

a memory configured to store data about the occurrences of the one or more events within the microprocessor; and a control unit coupled to the bus monitor and the memory, wherein the control unit is configured to detect the one or more indications provided by the bus monitor and, in response, to control the memory to store data indicating a number of the occurrences of each of the one or more events during each of a plurality of consecutive time periods;

wherein the memory comprises a different storage location per event per time period, so that each storage location is configured to store a number of occurrences of a respective one of the one or more events during a respective one of the plurality of consecutive time periods.

14. The computer system as recited in claim 13, wherein each of the plurality of consecutive time periods is of equal length.

15. The computer system as recited in claim 13, wherein the bus monitor is further configured to generate an event address portion for each occurrence of the one or more events, wherein the event address portion indicates which of the one or more events occurred, and wherein the memory is configured to receive the event address portion.

16. The computer system as recited in claim 15, wherein the control unit is configured to cause one of the numbers stored in one of the storage locations indicated by the event address portion to be incremented in response to an occurrence of one of the events indicated by the event address portion.

17. The computer system as recited in claim 13, the microprocessor further comprising:

a histogram counter configured to generate a time period address for each of the plurality of consecutive time periods; and wherein the memory is configured to receive the time period address.

18. The computer system as recited in claim 17, wherein the memory comprises a plurality of sections, wherein each section is selected by the time period address, wherein each section is configured to store a number of occurrences of each of the one or more events during a respective one of the plurality of consecutive time periods indicated by the time period address.

19. The computer system as recited in claim 17, the microprocessor further comprising a time base register coupled to the histogram counter, wherein the time base register is programmable to store an indication of the length of each of the plurality of consecutive time periods, wherein each of the plurality of consecutive time periods is of equal length as indicated by the time base register.

20. The computer system as recited in claim 13, the microprocessor further comprising a plurality of event select registers, wherein each event select register is programmable to indicate an event to be detected by the bus monitor.

21. The computer system as recited in claim 13, the microprocessor further comprising a control register programmable to enable and disable the bus monitor.

22. The computer system as recited in claim 13, the microprocessor further comprising:
a data register readable to retrieve from the memory the data indicating the number of the occurrences of the one or more events within the microprocessor; and
a control register programmable to indicate a location of the memory readable through the data register.

23. The computer system as recited in claim 13, wherein the bus monitor is configured to monitor address, data and control signals within the microprocessor to detect the occurrences of the one or more events.

24. The computer system as recited in claim 13, wherein the one or more events are selected from the group consisting of: a data read, a data write, a data read or data write, a data TLB (Translation Lookaside Buffer) miss, and a data read miss.

25. A method for monitoring events in a microprocessor, comprising:
selecting one or more events;
detecting occurrences of the one or more events within the microprocessor, wherein said detecting comprises detecting occurrences of the one or more events during each of a plurality of consecutive time periods; and
storing in memory performance data indicating a number of occurrences of each of the one or more events during each of the plurality of consecutive time periods, wherein said storing comprises storing the number of occurrences of each of the one or more events in a different storage location per event per time period, so that each storage location stores the number of occurrences of one of the one or more events during one of the plurality of consecutive time periods.

26. The method as recited in claim 25, wherein each of the plurality of consecutive time periods is of equal length.

27. The method as recited in claim 25, wherein said detecting comprises generating an event address portion for each occurrence of the one or more events, wherein the event address portion indicates which of the one or more events occurred.

28. The method as recited in claim 27, wherein said storing comprises incrementing a number stored in one of the storage locations indicated by the event address portion within a section of the memory in response to an occurrence of the event indicated by the event address portion.

29. The method as recited in claim 27, further comprising:
generating a time period address portion for each of the plurality of consecutive time periods; and
wherein said storing comprises storing the number of occurrences in the storage location of the memory indicated by said event address portion and said time period address portion.

30. The method as recited in claim 29, further comprising programmably selecting the length of each of the plurality of consecutive time periods, wherein each of the plurality of consecutive time periods is of equal length.

31. The method as recited in claim 25, wherein said selecting comprises programmably selecting the one or more events from a plurality of detectable events.

32. The method as recited in claim 25, further comprising programmably enabling and disabling said detecting and said storing.

33. The method as recited in claim 25, further comprising:
retrieving from the memory the data indicating the number of occurrences of each of the one or more events during each of the plurality of consecutive time periods; and
generating an event histogram from the retrieved data.

34. The method as recited in claim 33, further comprising analyzing information shown by the event histogram in order to improve the performance of a memory system coupled to the microprocessor.

35. The method as recited in claim 33, further comprising tuning a compiler according to information shown by the event histogram to improve the performance of the microprocessor when executing instructions generated by the compiler.

36. The method as recited in claim 25, wherein said detecting comprises monitoring address, data and control signals within the microprocessor to detect occurrences of the one or more events.

37. The method as recited in claim 25, wherein said selecting comprises selecting the one or more events from the group consisting of: a data read, a data write, a data read or data write, a data TLB (Translation Lookaside Buffer) miss, and a data read miss.

* * * * *